(12) United States Patent
Kajihara et al.

(10) Patent No.: US 10,971,120 B2
(45) Date of Patent: Apr. 6, 2021

(54) STRAP PIN FITTING

(71) Applicants: Gotoh Gut Co., Ltd., Isesaki (JP);
Gunma Prefecture, Maebashi (JP)

(72) Inventors: Atsushi Kajihara, Maebashi (JP);
Masaki Gotoh, Isesaki (JP); Hiroshi Miyajima, Yokohama (JP)

(73) Assignees: GOTOH GUT CO., LTD., Isesaki (JP); GUNMA PREFECTURE, Maebashi (JP)

(*) Notice: Subject to any disclaimer, the term of this patent is extended or adjusted under 35 U.S.C. 154(b) by 0 days.

(21) Appl. No.: 16/860,600

(22) Filed: Apr. 28, 2020

(65) Prior Publication Data

US 2020/0258486 A1    Aug. 13, 2020

Related U.S. Application Data

(63) Continuation of application No. PCT/JP2018/040093, filed on Oct. 29, 2018.

(30) Foreign Application Priority Data

Oct. 31, 2017  (JP) .............................. JP2017-211053

(51) Int. Cl.
*G10G 5/00* (2006.01)
*F16B 5/06* (2006.01)
*G10D 1/08* (2006.01)

(52) U.S. Cl.
CPC .............. *G10G 5/005* (2013.01); *F16B 5/06* (2013.01); *G10D 1/08* (2013.01)

(58) Field of Classification Search
None
See application file for complete search history.

(56) References Cited

U.S. PATENT DOCUMENTS

| 828,573 | A | * | 8/1906 | Rubin | ..................... B60C 27/08 |
| | | | | | 24/376 |
| 3,512,226 | A | * | 5/1970 | Carlile | ................... A44B 17/00 |
| | | | | | 24/669 |

(Continued)

FOREIGN PATENT DOCUMENTS

| CN | 1502510 A | 6/2004 |
| CN | 106952635 A | 7/2017 |

(Continued)

OTHER PUBLICATIONS

International Preliminary Report on Patentability PCT/JP2018/040093 (PCT/IPEA/409), dated Oct. 1, 2019.

(Continued)

*Primary Examiner* — Robert W Horn
(74) *Attorney, Agent, or Firm* — Birch, Stewart, Kolasch & Birch, LLP

(57) ABSTRACT

Provided is a strap pin fitting allowing easy attachment and detachment of a strap with respect to a musical instrument. A strap pin fitting includes: a base plate; a strap retaining portion arranged on the base plate and configured to retain a strap; a through-hole formed in the base plate and allowing insertion of a strap pin; and a presser plate attached to the base plate. The presser plate is movable between an open position where the through-hole is opened and where the operation of inserting the strap pin into the through-hole is allowed and a closed position where a part of the through-hole is closed and where detachment of the strap pin from the through-hole is prevented.

6 Claims, 9 Drawing Sheets

(56) References Cited

U.S. PATENT DOCUMENTS

| | | | | |
|---|---|---|---|---|
| 4,144,794 | A | * | 3/1979 | Silverman .............. G10G 5/005 224/257 |
| 4,993,127 | A | * | 2/1991 | Mechem ................ A45C 13/30 224/257 |
| 5,615,462 | A | * | 4/1997 | Goto ...................... G10G 5/005 224/257 |
| 6,080,922 | A | * | 6/2000 | Dimbath ................ G10G 5/005 84/327 |
| 6,259,009 | B1 | * | 7/2001 | Bolo, III ................ G10G 5/005 84/329 |
| 7,045,694 | B2 | * | 5/2006 | Yasunori ............ A44B 11/2584 24/633 |
| 7,256,337 | B1 | * | 8/2007 | Walker .................. G10D 3/173 84/327 |
| 7,562,422 | B2 | * | 7/2009 | D'Addario ............. G10G 5/005 24/701 |
| 7,818,851 | B2 | * | 10/2010 | Perrotta ................. G10G 5/005 24/701 |
| 7,888,572 | B2 | * | 2/2011 | Rosenberg ............ G10G 5/005 84/327 |
| D637,942 | S | * | 5/2011 | Lee .............................. D11/218 |
| 8,920,092 | B2 | * | 12/2014 | D'Addario ............. G10G 5/005 411/371.2 |
| 9,589,547 | B2 | * | 3/2017 | Koster ............... A44B 11/2584 |
| 9,947,303 | B1 | * | 4/2018 | Dulin ................ A44B 13/0005 |
| 9,990,910 | B2 | * | 6/2018 | Steinberger .......... A44B 17/007 |
| 2004/0159208 | A1 | | 8/2004 | Yasunori |
| 2006/0081112 | A1 | * | 4/2006 | Gipson .................. G10G 5/005 84/327 |
| 2011/0136359 | A1 | * | 6/2011 | Gregg .................. H01R 13/639 439/148 |
| 2017/0206871 | A1 | | 7/2017 | Steinberger |
| 2020/0258486 | A1 | * | 8/2020 | Kajihara .................. G10D 1/08 |

FOREIGN PATENT DOCUMENTS

| | | |
|---|---|---|
| EP | 1 033 700 A2 | 9/2000 |
| JP | 35-23275 Y1 | 9/1960 |
| JP | 49-135593 U | 11/1974 |
| JP | 50-83460 U | 7/1975 |
| JP | 63-157324 U | 7/1975 |
| JP | 9-140439 A | 6/1997 |
| JP | 2004-183739 A | 7/2004 |
| JP | 2013-217991 A | 10/2013 |

OTHER PUBLICATIONS

International Search Report issued in PCT/JP2018/040093 (PCT/ISA/210), dated Nov. 27, 2018.
Written Opinion of the International Searching Authority issued in PCT/JP2018/040093 (PCT/ISA/237), dated Nov. 27, 2018.
Chinese Office Action and Search Report dated Sep. 11, 2020 for corresponding Application No. 201880070569.1 with an English Translation.
Extended European Search Report dated Oct. 28, 2020 in counterpart European Patent Application No. 18873621.9.

* cited by examiner

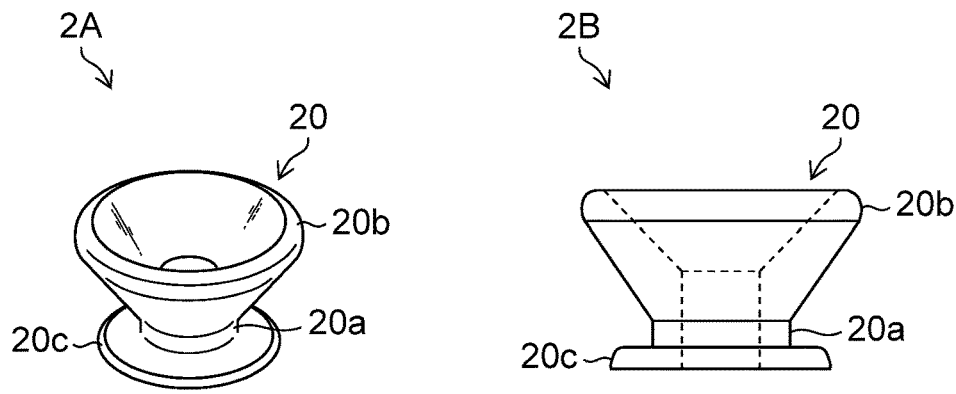
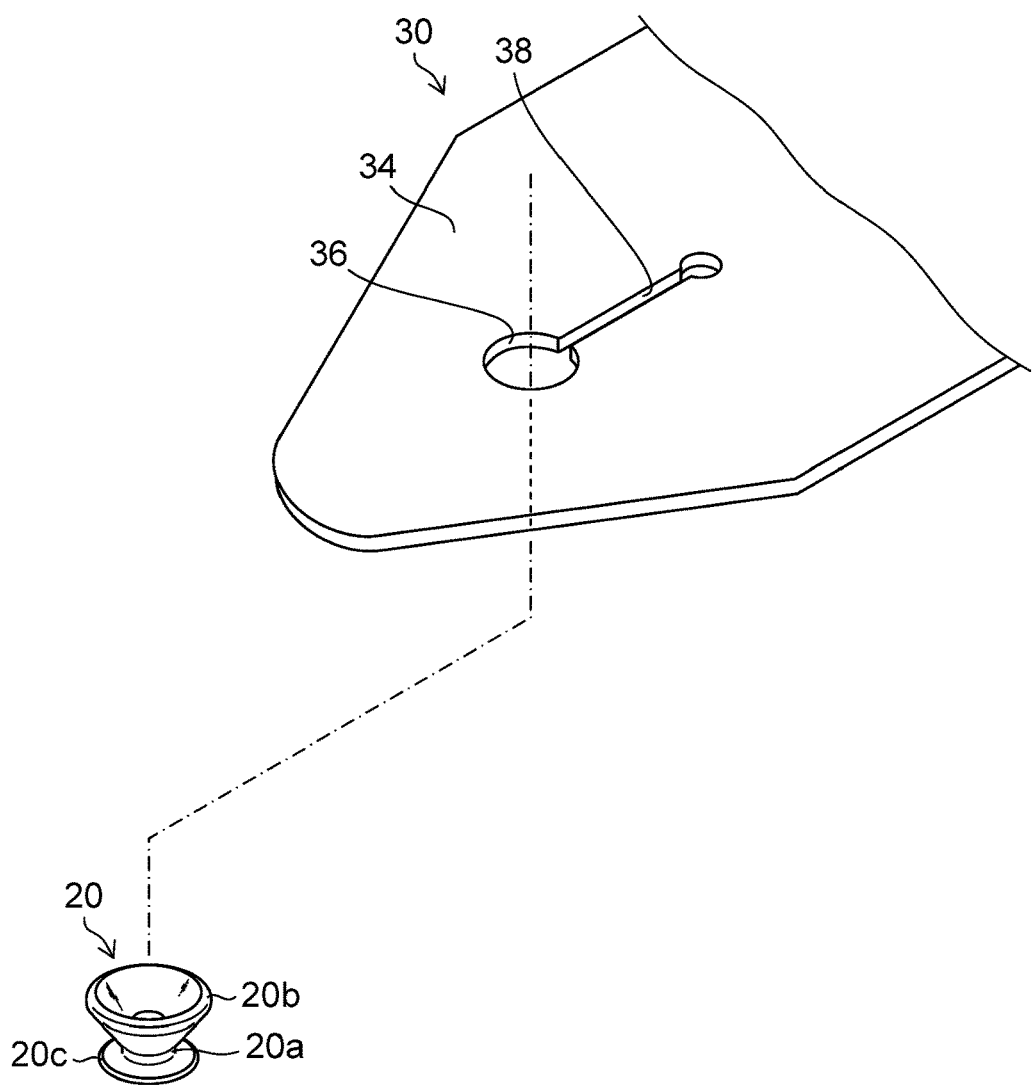

FIG.7
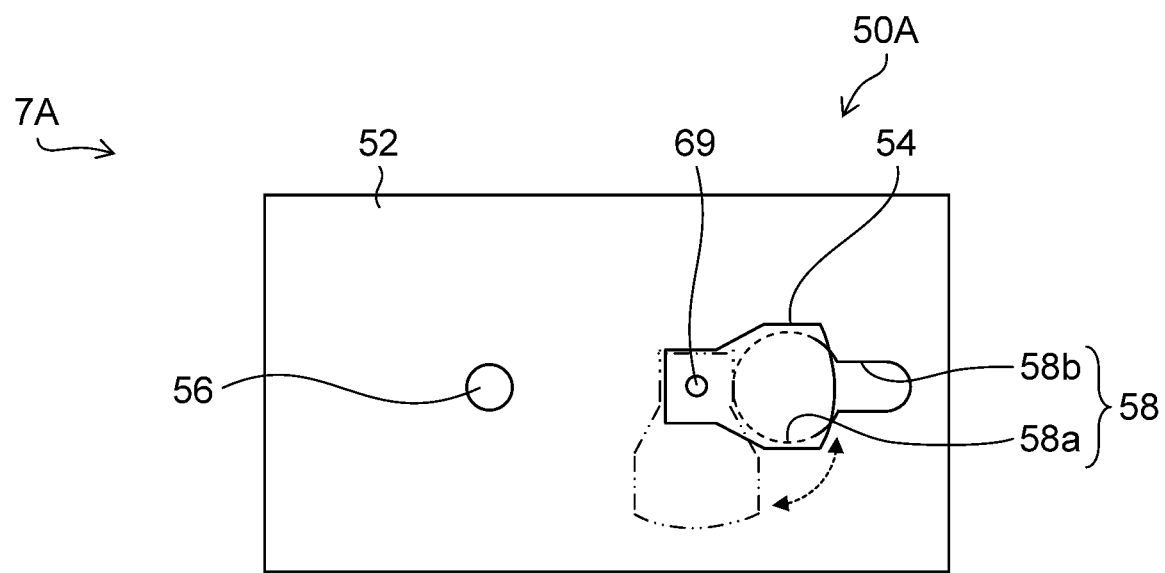
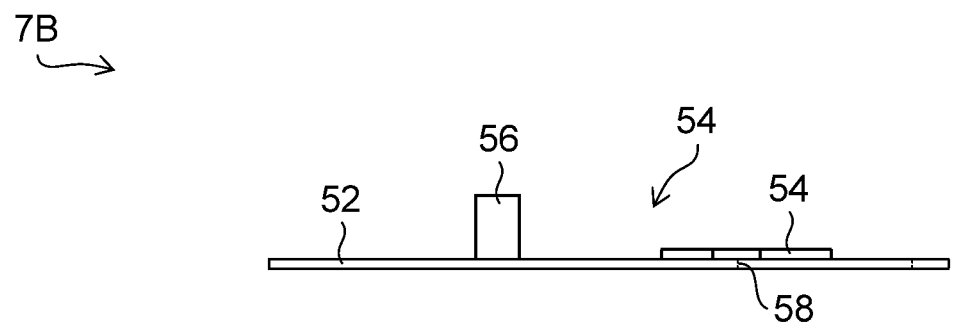

FIG.8
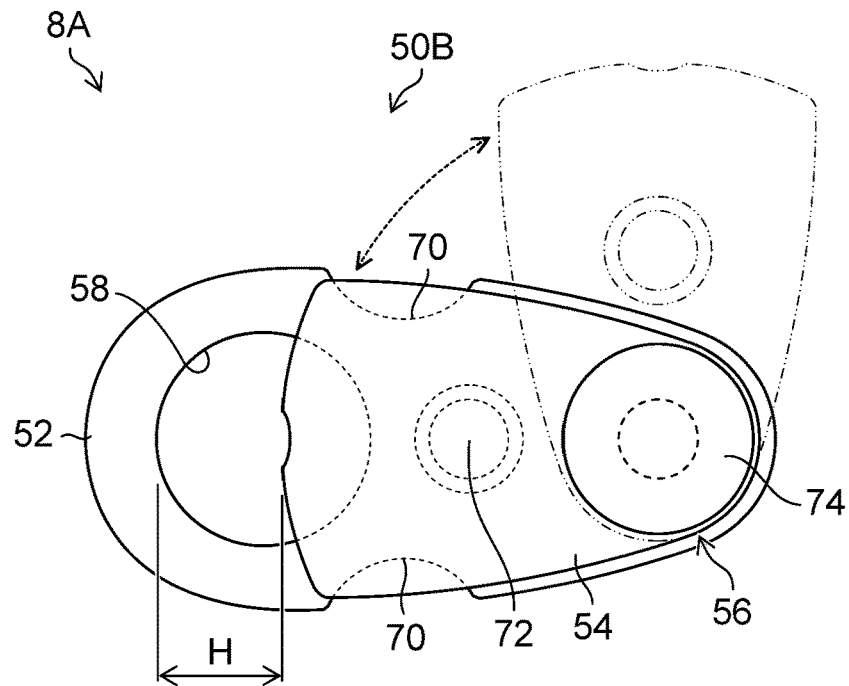
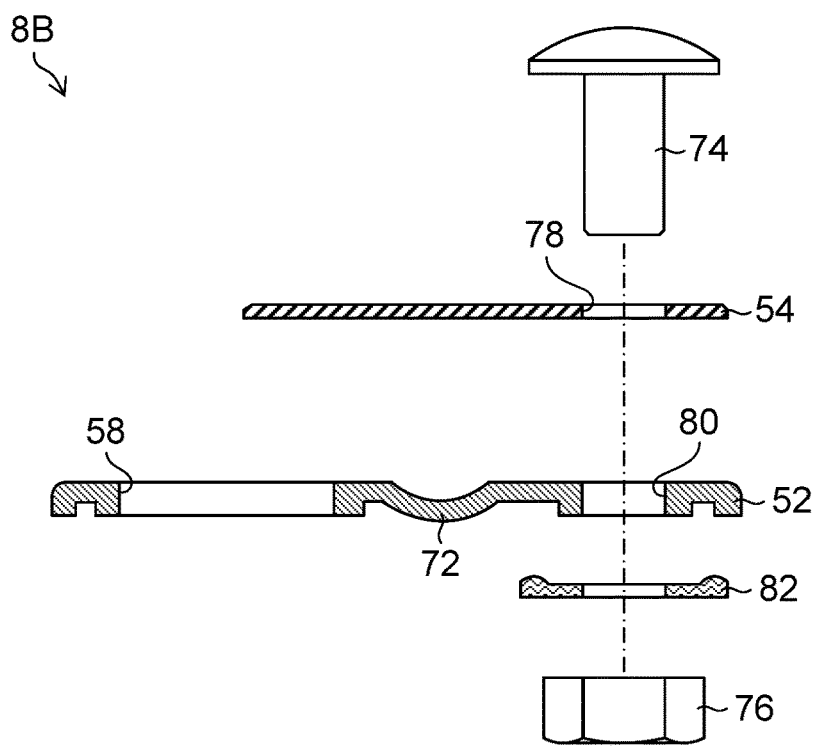

FIG.9
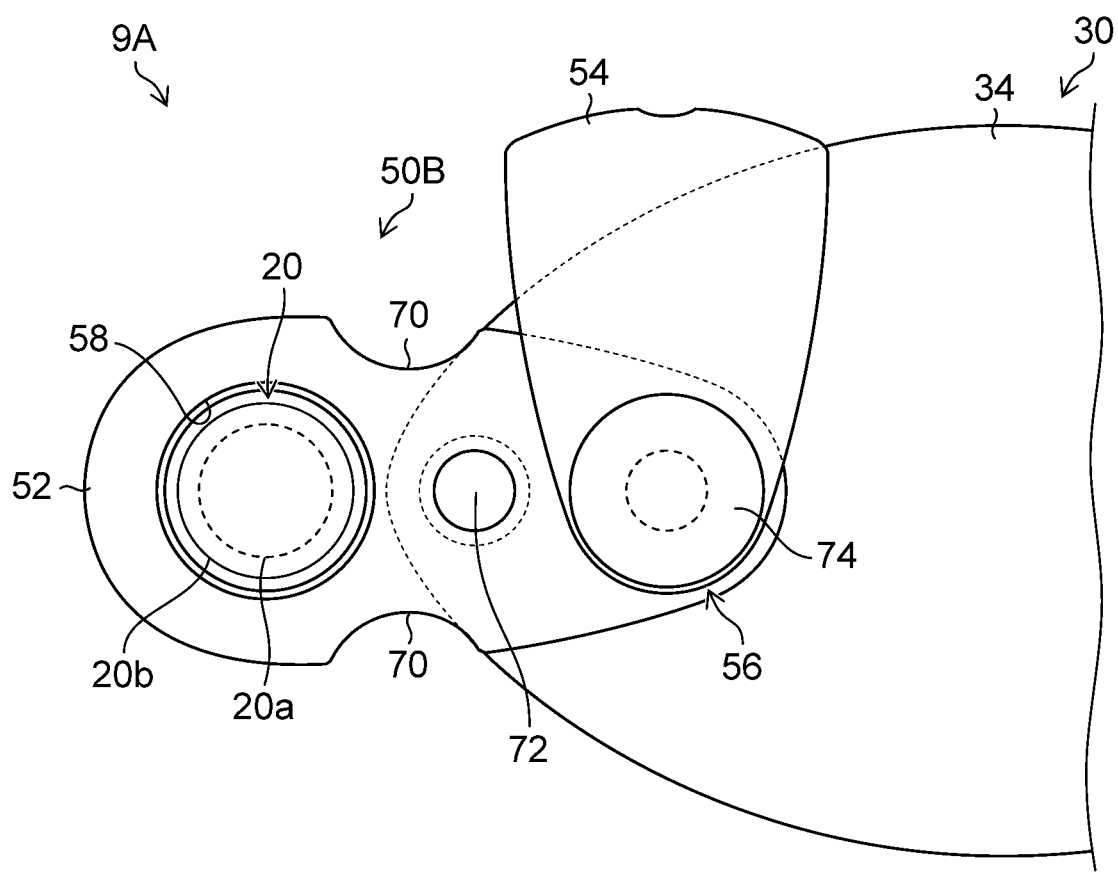
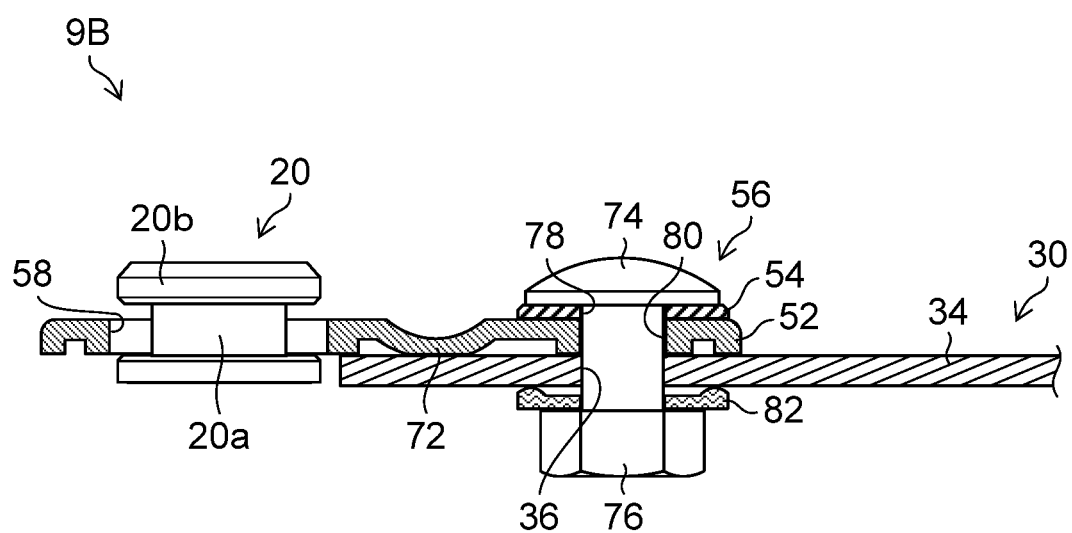

FIG.10
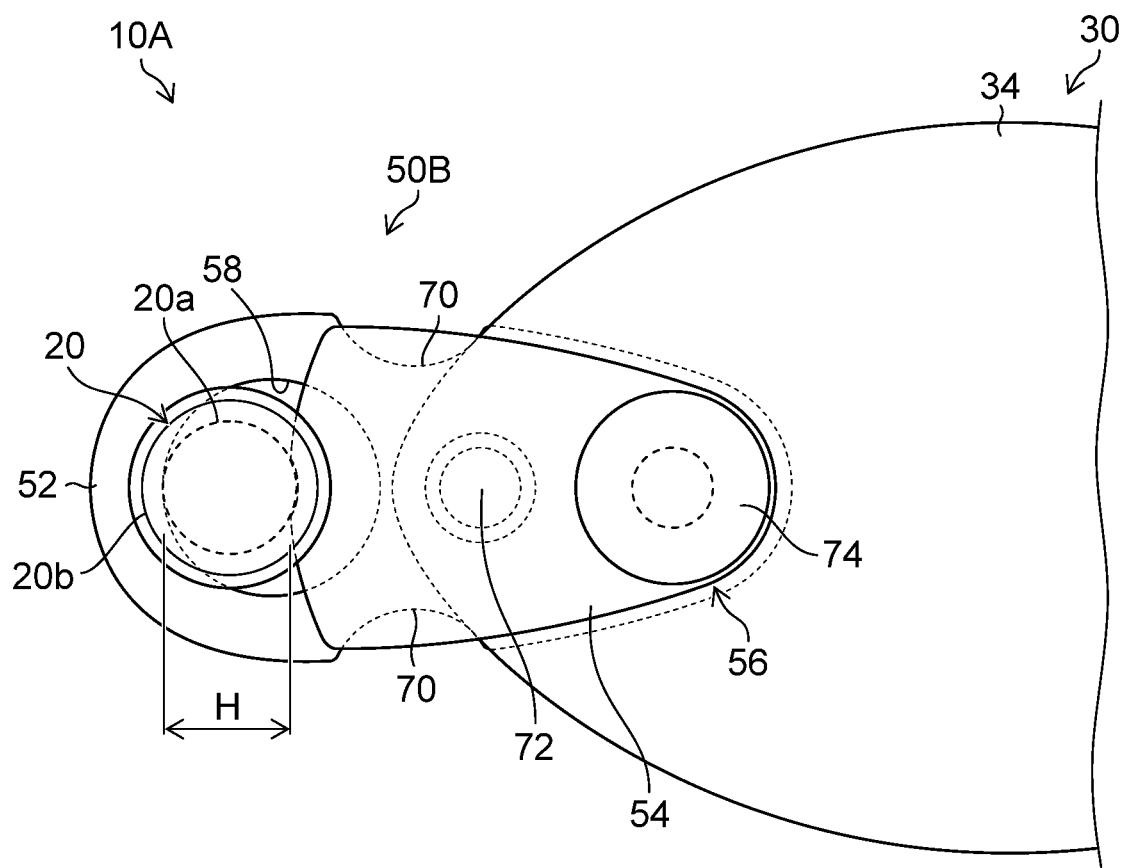
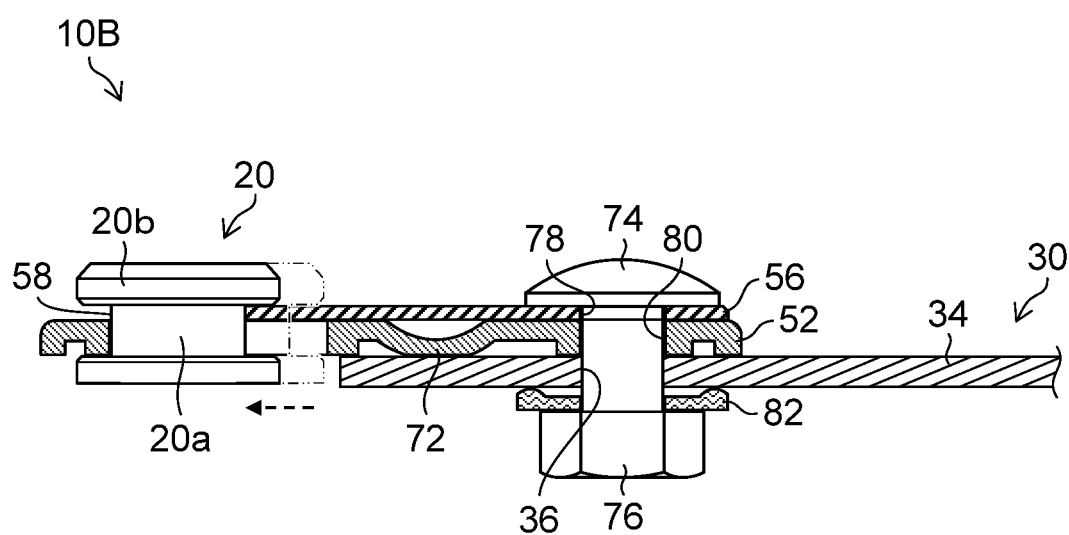

STRAP PIN FITTING

CROSS-REFERENCE TO RELATED APPLICATIONS

The present application is a Continuation of PCT International Application No. PCT/JP2018/040093 filed on Oct. 29, 2018 claiming priority under 35 U.S.C. § 119(a) to Japanese Patent Application No. 2017-211053 filed on Oct. 31, 2017. Each of the above applications is hereby expressly incorporated by reference, in its entirety, into the present application.

BACKGROUND OF THE INVENTION

1. Field of the Invention

The present invention relates to a strap pin fitting for attaching a strap to a musical instrument such as a guitar.

2. Description of the Related Art

FIG. 1 is a diagram showing an example of strap pins 20 installed to a musical instrument 12. As shown in FIG. 1, in a case where a user plays the musical instrument 12 such as a guitar while standing up, a musical instrument strap (hereinafter simply referred to as a "strap") 30 is used. In view of this, the strap pins 20 for attaching the strap 30 are installed to the musical instrument 12. The strap 30 includes a belt-shaped member 32 whose length is adjustable, and tongue-shaped attachment portions 34 respectively provided at both ends of the belt-shaped member 32. Each of the attachment portion 34 has an attaching hole 36 (See FIG. 3), and each of the strap pin 20 is detachably attached to the attaching hole 36. In the example shown in FIG. 1, the strap pins 20 are respectively attached to an end portion 14 of a body 13 of the musical instrument 12 and to a heel portion 16 which is a joining portion with a neck 15 and is on a side opposite the end portion 14 of the body 13 of the musical instrument 12, however, the arrangement of the strap pins 20 should not be limited to the example.

FIG. 2 is a diagram showing an example of the strap pin 20. In FIG. 2, a reference numeral 2A designates a perspective view of the strap pin 20, and a reference numeral 2B designates a side view of the strap pin 20. As shown in the reference numerals 2A and 2B, the strap pin 20 has: a constricted portion 20a having a circular cross-sectional shape; a divergent portion 20b which is provided at a tip end of the constricted portion 20a and has a shape diverging (expanding) outwards (in a radial direction orthogonal to an axial direction of the constricted portion 20a); and an attaching portion (an attaching plate) 20c which is provided on a side opposite the divergent portion 20b of the constricted portion 20a and constituting an attaching surface to the musical instrument 12. The strap pin 20 is fastened to the musical instrument 12 by a screw (not shown). The strap pin 20 is of various configurations and sizes, which, however, are substantially of the same general features as those shown in FIG. 2.

FIG. 3 is a diagram showing an example of the attachment portion 34 of the strap 30. As shown in FIG. 3, the attachment portion 34 of the strap 30 has an attaching hole 36 for attaching the strap pin 20. A slit 38 is formed continuously with the attaching hole 36. In a case where the strap 30 is to be attached to the musical instrument 12, the divergent portion 20b of the strap pin 20 is passed through the attaching hole 36 while expanding the attaching hole 36 by virtue of the slit 38, and the constricted portion 20a is situated at the attaching hole 36. Then, the slit 38 is contracted at the constricted portion 20a to fasten the strap pin 20 and the strap pin 20 is prevented from detaching by the divergent portion 20b so that the strap 30 is kept attached to the musical instrument 12. As a result, in a case where a player plays the musical instrument while standing up, the player can use the strap 30 attached to the musical instrument 12 to hang the musical instrument 12 from his shoulder.

However, because the attaching hole 36 for attaching the strap pin 20 is continuous with the slit 38 in the attachment portion 34 of the strap 30 shown in FIG. 3, the strap 30 easily comes off from the strap pin 20 provided on the musical instrument 12.

In view of the above-mentioned problem, Japanese Patent Application Laid-Open No. 2013-217991 (hereinafter referred to as "PTL 1") discloses a strap configured such that a reinforcing portion is superimposed on the strap attachment portion so that the strap attachment portion and the reinforcing portion are superimposed one upon the other to attach to the strap pin, and the slit extending from the attaching hole (retaining hole) in the reinforcing portion is formed at a position different from the slit extending from the attaching hole (retaining hole) in the strap attachment portion.

Citation List

Patent Literature 1: Japanese Patent Application Laid-Open No. 2013-217991

SUMMARY OF THE INVENTION

When the player puts away the musical instrument after completion of his/her performance, the player detaches the strap, which has held the musical instrument to his body, from the strap pins. And when he/she is to resume his/her performance, the player puts the strap on his shoulder, and attaches the attaching holes of the strap to the strap pins of the musical instrument for preparation. Also in a case where he/she changes musical instruments, it is necessary to attach and detach the strap.

In the strap disclosed in PTL 1, the strap is not so easily detached from the strap pin of the musical instrument as compared with the conventional strap (See FIG. 3). On the other hand, as a result of the adoption of this structure, the strap becomes harder to detach, which is inconvenient for the player. Further, when the attaching and detaching of the strap is repeated, the attaching hole of the strap necessarily becomes loose. This reduces the force to retain the musical instrument and raises possibility of dropping the musical instrument.

The present invention has been made in view of the above-mentioned problems. The present invention aims to provide a strap pin fitting allowing easy attachment and detachment of the strap to and from the musical instrument.

To achieve the above-mentioned object, the present invention provides the following structure.

A strap pin fitting according to a first aspect of the present invention, includes: a base plate; a base plate; a strap retaining portion arranged on the base plate and configured to retain a strap; a through-hole formed in the base plate and configured to allow insertion of a strap pin; and a presser plate attached to the base plate and configured to be movable between an open position where the through-hole is opened so as to allow insertion of the strap pin into the through-hole and a closed position where a part of the through-hole is closed so as to prevent detachment of the strap pin from the through-hole.

According to a second aspect of the present invention, in the strap pin fitting of the first aspect, the presser plate is attached so as to be rotatable around a rotation axis that is in a direction orthogonal to a normal direction of the base plate.

According to a third aspect of the present invention, in the strap pin fitting of the first aspect, the presser plate is attached so as to be rotatable around a rotation center that is in a normal direction of the base plate.

According to a fourth aspect of the present invention, the strap pin fitting of the second aspect or the third aspect, includes an urging member configured to urge the presser plate toward the closed position.

According to a fifth aspect of the present invention, in the strap pin fitting of any one of the first to fourth aspects, the through-hole is formed by connecting together a large-hole portion and a small-hole portion that differ from each other in hole diameter.

According to a sixth aspect of the present invention, in the strap pin fitting of any one of the first to fourth aspects, the through-hole is formed by a single round hole.

According to the present invention, it is possible to easily perform the attachment and detachment of the strap to and from the musical instrument.

BRIEF DESCRIPTION OF THE DRAWINGS

FIG. 2 is a diagram illustrating an example of the strap pin.

FIG. 3 is a diagram illustrating an example of a strap attachment portion.

FIG. 7 is a diagram illustrating a strap pin fitting according to a second embodiment.

FIG. 8 is a diagram illustrating a strap pin fitting according to an example of development of the present invention.

FIG. 9 is a diagram for illustrating a method of connecting the strap pin fitting and the strap pin according to the example of development of the present invention.

FIG. 10 is a diagram for illustrating the method of connecting the strap pin fitting and the strap pin according to the example of development of the present invention.

DESCRIPTION OF EMBODIMENTS

In the following, preferred embodiments of the present invention will be described in detail with reference to the attached drawings.

(First Embodiment)

Figure 1:
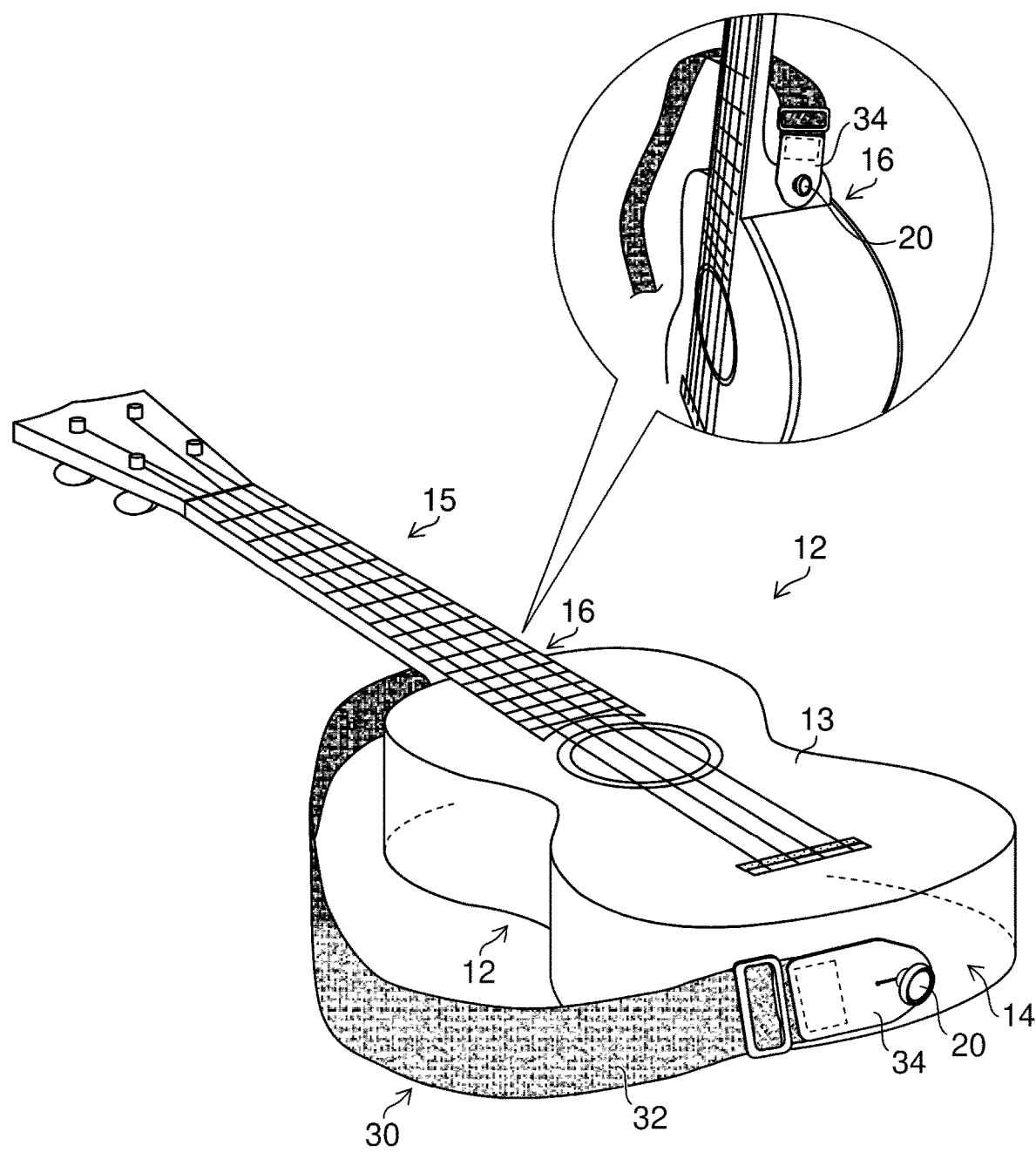
FIG. 1 is a diagram illustrating an example of strap pins installed to a musical instrument.
Figure 4:
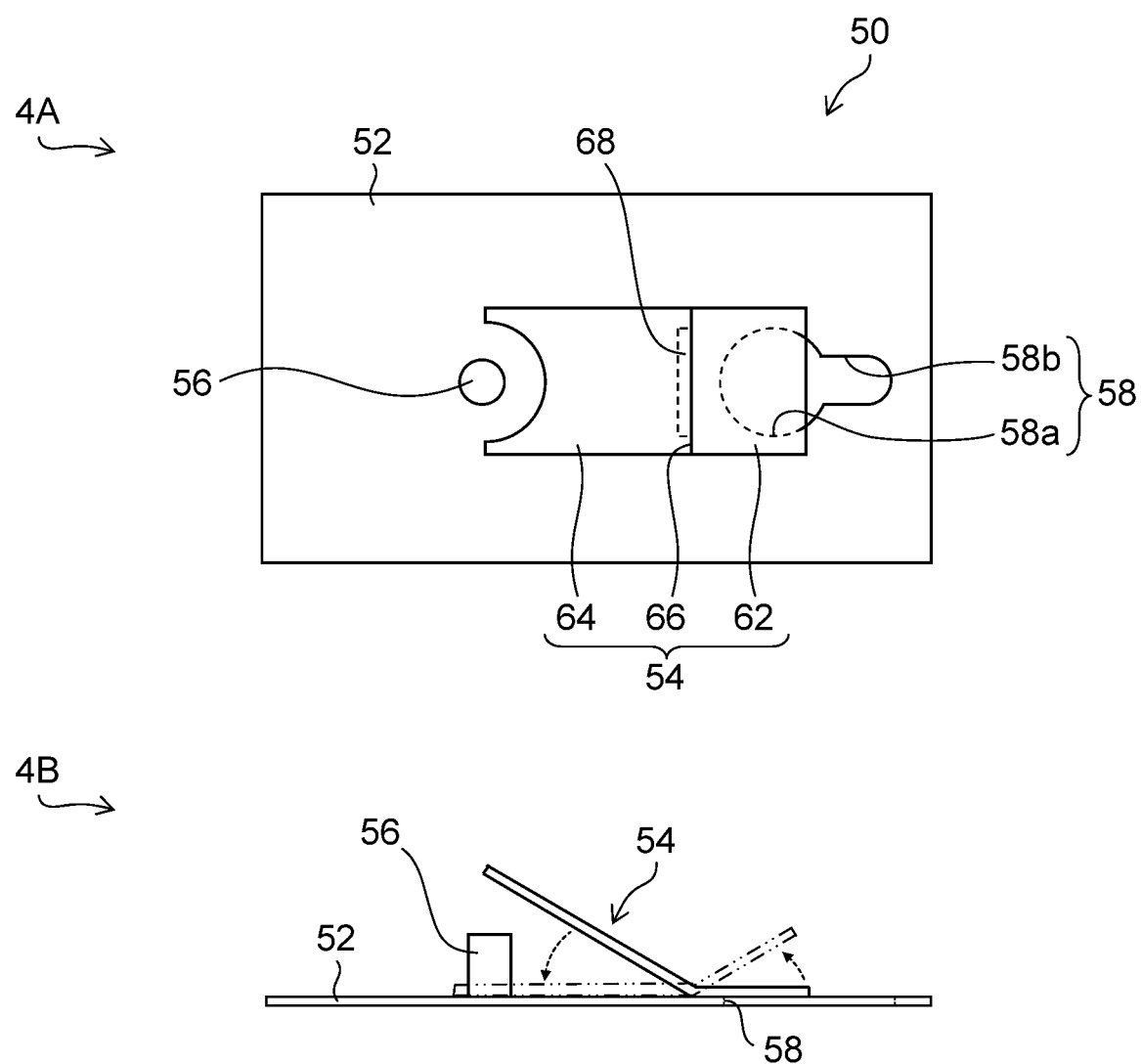
FIG. 4 is a diagram illustrating a strap pin fitting according to a first embodiment.

FIG. 4 is a diagram illustrating a strap pin fitting 50 according to the first embodiment. In FIG. 4, reference numeral 4A designates a plan view of the strap pin fitting 50, and reference numeral 4B designates a side view of the strap pin fitting 50.

As shown in FIG. 4, the strap pin fitting 50 according to the present embodiment is a connection member existing between the strap pin 20 and the strap 30, and connecting them to each other. The strap pin fitting 50 mainly includes a base plate 52, a presser plate 54, and a strap retaining portion 56.

The base plate 52 is formed of a flat plate-shaped member. In the base plate 52, a through-hole 58 is formed so as to allow insertion of the strap pin 20. The through-hole 58 is formed in such a manner that a large-hole portion 58a and a small-hole portion 58b which differ from each other in hole diameter, are connected together. As shown by reference numeral 4A of FIG. 4, in plan view, the large-hole portion 58a has a substantially circular shape. The small-hole portion 58b has an elongated-hole shape extending from the large-hole portion 58a in a direction opposite the strap retaining portion 56.

The large-hole portion 58a is formed to be larger than an outer diameter of the divergent portion 20b of the strap pin 20, and has a size which allows the divergent portion 20b of the strap pin 20 to pass therethrough.

The small-hole portion 58b is formed to be larger than the outer diameter of the constricted portion 20a of the strap pin 20 and smaller than the outer diameter of the divergent portion 20b of the strap pin 20. The small-hole portion 58b has a size which solely allows the constricted portion 20a of the strap pin 20 to pass therethrough.

The presser plate 54 has a shape which is bent on a rear side (the strap retaining portion 56 side) in a front-rear direction (a longitudinal direction of the base plate 52). That is, as shown by reference numeral 4B of FIG. 4, when the base plate 52 is seen from a side direction, the presser plate 54 as a whole has a substantially doglegged shape (or L-shape). The presser plate 54 is of a structure in which a front end portion 62 on the front side and a rear end portion 64 on the rear side are connected via a bent portion 66 that is a boundary portion of them.

Further, the presser plate 54 is attached to the base plate 52 so as to be rotatable around a rotation axis (rotation center) in a direction orthogonal to a normal direction of the base plate 52. More specifically, the presser plate 54 is attached onto a bending line which is along a direction orthogonal to the longitudinal direction of the base plate 52 via a hinge portion 68 in such a manner that the presser plate 54 is rotatable around the rotation axis (rotation center) in a direction which is along the bending line. The hinge portion 68 includes a hinge with a spring (corresponding to the "urging member" of the present invention) The hinge portion 68 is urged by the urging force of the spring in the direction in which the front end portion 62 of the presser plate 54 is pressed against the base plate 52. That is, by the spring of the hinge portion 68, the front end portion 62 of the presser plate 54 is urged toward a closed position where the large-hole portion 58a which is a part of the through-hole 58 is closed.

When, in a state in which the front end portion 62 of the presser plate 54 is thus urged toward the closed position by the spring of the hinge portion 68, the presser plate 54 is pushed against the urging force of the spring (the front end portion 62 is pushed from below or the rear end portion 64 is pushed from above), the front end portion 62 of the presser plate 54 moves to an open position where the large-hole portion 58a of the through-hole 58 is opened, and there is attained a state in which the strap pin 20 can be inserted into the large-hole portion 58a of the through-hole 58.

The strap retaining portion 56 includes a columnar member arranged on the base plate 52. The strap retaining portion 56 is formed to have a size which allows the strap retaining portion 56 to pass through the attaching hole 36 of the attachment portion 34 of the strap 30. In a case where the strap 30 is to be fastened to the strap retaining portion 56, the strap retaining portion 56 is passed through the attaching hole 36 of the attachment portion 30 of the strap 34 and fastened by a screw (not shown), whereby the attachment portion 34 of the strap 30 is connected to the strap retaining portion 56. Alternatively, a cap may be fitted with the distal end of the strap retaining portion 56 when connecting the attachment portion 34 of the strap 30 to the strap retaining portion 56. Or, the strap retaining portion 56 and the attachment portion 34 of the strap 30 may be connected by a cord or the like. Further, the strap retaining portion 56 and the attachment portion 34 of the strap 30 may be connected by using a pin, an E-type retaining ring or the like.

Figure 5:
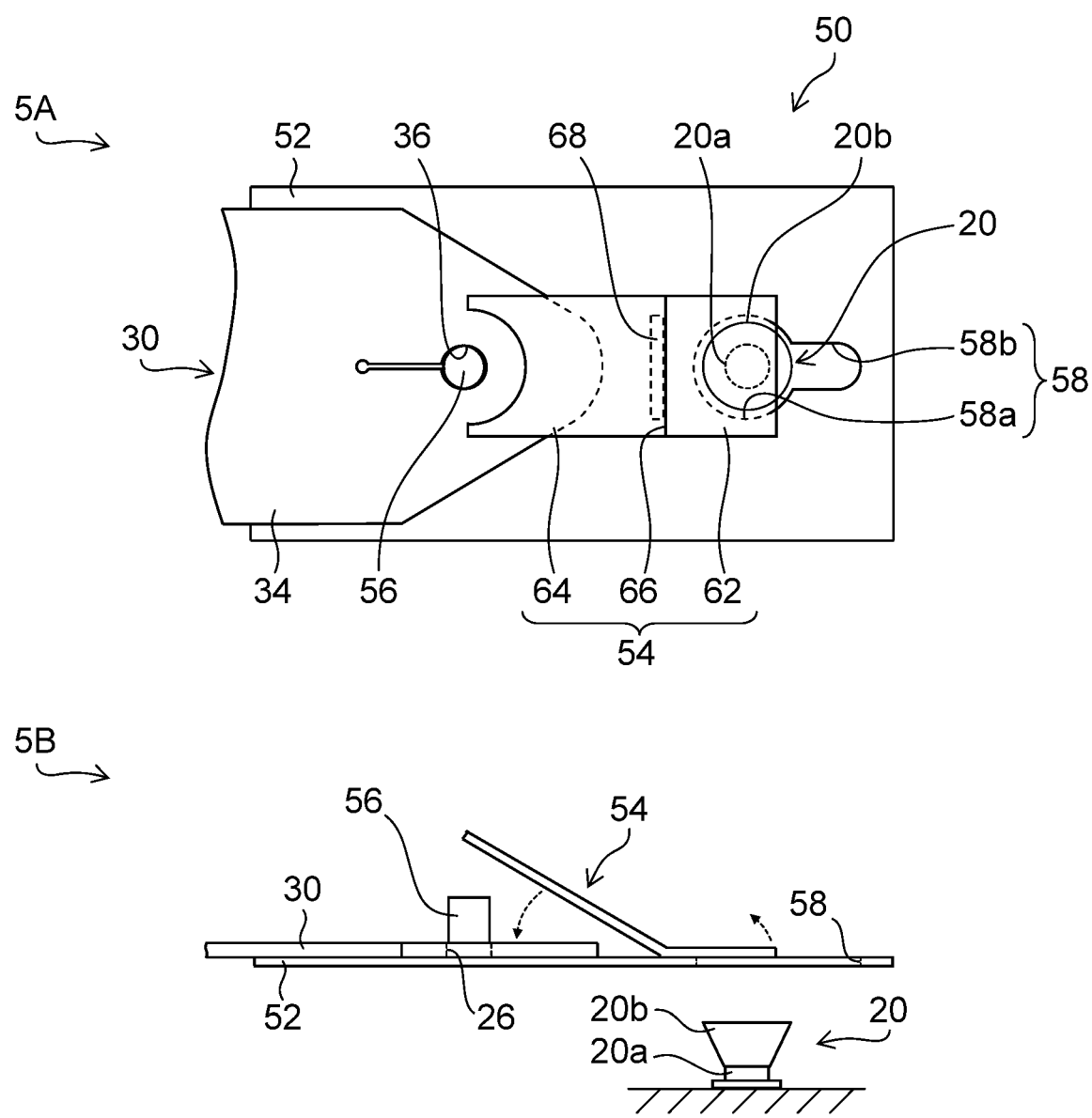
FIG. 5 is a diagram for illustrating a method of connecting the strap pin fitting and the strap pin according to the first embodiment.
Figure 6:
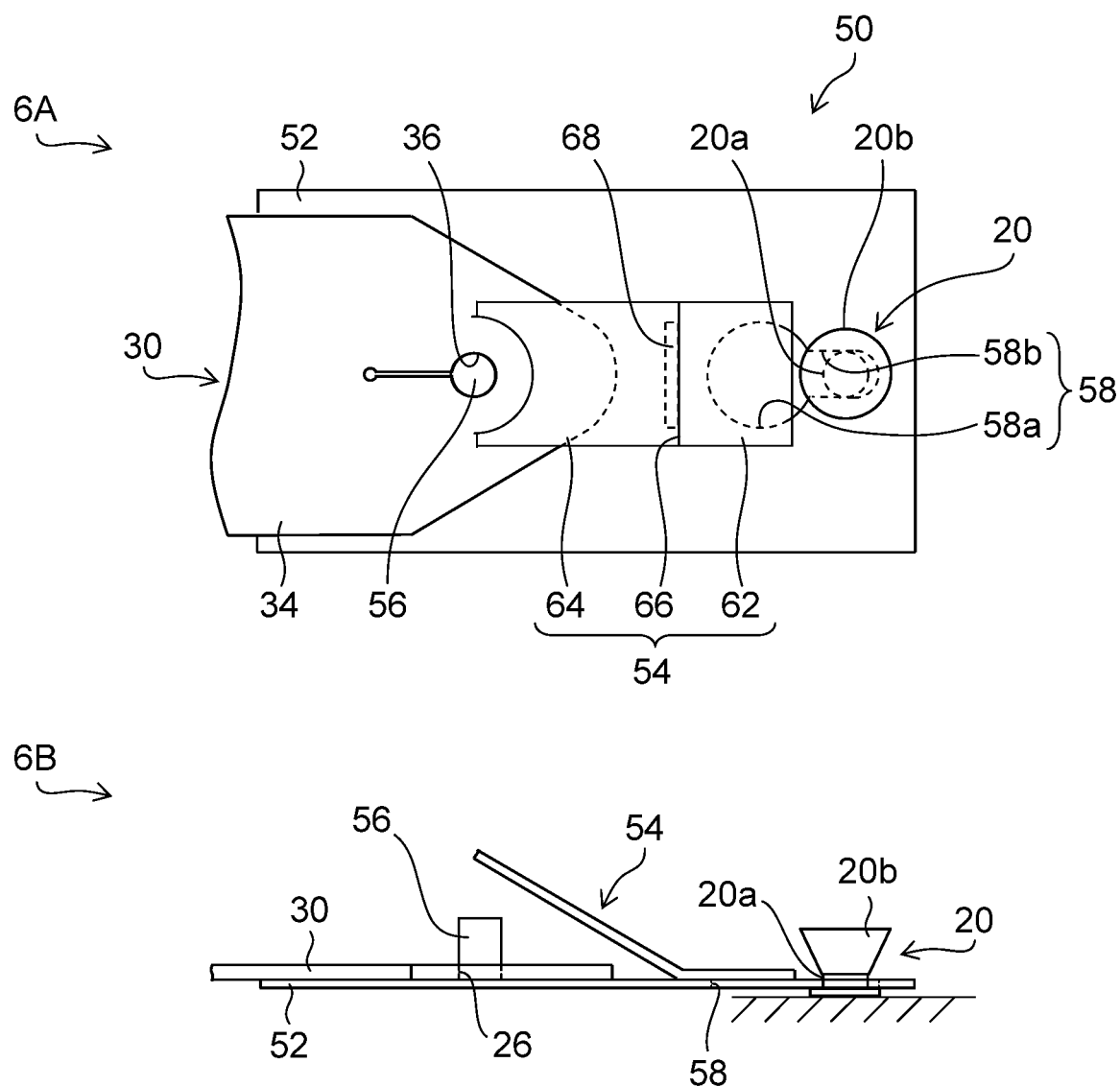
FIG. 6 is a diagram for illustrating the method of connecting the strap pin fitting and the strap pin according to the first embodiment.

In the a where the strap 30 is to be attached to the musical instrument 12 by using the strap pin fitting 50 constructed as described above, the strap retaining portion 56 is first inserted into the attaching hole 36 of the attachment portion 34 of the strap 30 and is fastened by a screw (not shown). Next, as shown by reference numerals 5A and 5B of FIG. 5, in a state in which positioning is effected between the strap pin 20 and the large-hole portion 58a of the through-hole 58, the strap pin 20 is passed through the large-hole portion 58a of the through-hole 58 from the lower surface side of the base plate 52. At this time, the front end portion 62 of the presser plate 54 which is urged toward the closed position by the urging force of the spring of the hinge portion 68 is pushed by the strap pin 20, whereby the front end portion 62 of the presser plate 54 moves to the open position such that the divergent portion 20b of the strap pin 20 can be inserted into the large-hole portion 58a of the through-hole 58. Then, after the strap pin 20 is inserted into the large-hole portion 58a till the constricted portion 20a of the strap pin 20, the constricted portion 20a of the strap pin 20 is caused to slide to the small-hole portion 58b of the through-hole 58 as shown by reference numerals 6A and 6B of FIG. 6. Then, due to the urging force of the spring, the presser plate 54 is restored of itself to the closed position where the large-hole portion 58a of the through-hole 58 is closed. As a result, the strap pin 20 is prevented from being detached from the through-hole 58, and a state is attained in which the strap pin fitting 50 and the strap pin 20 are reliably connected to each other.

When the musical instrument 12 is to be removed after the performance, the rear end portion 64 of the presser plate 54 is pushed in from above toward the base plate 52, whereby the front end portion 62 of the presser plate 54 which is closing the large-hole portion 58a of the through-hole 58 moves from the closed position to the open position. Therefore, it is possible to slide the strap pin 20 to the large-hole portion 58a side, and easily detach the strap pin 20 from the large-hole portion 58a.

As described above, the strap pin fitting 50 of the present embodiment includes: the base plate 52; the strap retaining portion 56 which is arranged on the base plate 52 and retains the strap 30, the through-hole 58 which is formed in the base plate 52 and allows the strap pin 20 to be inserted therethrough; and the presser plate 54 attached to the base plate 52. The presser plate 54 is configured to be movable between the open position where the through-hole 58 is opened such that the strap pin 20 can be inserted into the through-hole 58, and the closed position where a part of the through-hole 58 is closed such that the strap pin 20 is prevented from being detached from the through-hole 58. Therefore, the connection and the disconnection between the strap pin fitting 50 and the strap pin 20 can be effected easily and quickly. Thus, the strap 30 and the strap pin 20 are connected through the intermediation of the strap pin fitting 50, whereby the strap 30 can be easily attached to and detached from the musical instrument 12.

While the presser plate 54 is urged by an urging member (the spring of the hinge portion 68) toward the closed position where a part of the through-hole 58 is closed in the present embodiment, this should not be construed restrictively. For example, by using a lock mechanism (engagement mechanism) (not shown), it is possible to switch between a lock state in which the presser plate 54 is fixed at the closed position and a non-lock state in which the presser plate 54 is movable between the closed position and the open position.

Further, while the base plate 52 includes a flat plate-shaped member in the present embodiment, this should not be construed restrictively. For example, the base plate 52 may be bent or curved to be crest-shaped or trough-shaped (valley-shaped) along the longitudinal direction of the base plate 52. Further, the presser plate 54 may be bent or curved to be crest-shaped or trough-shaped (valley-shaped) in conformity with the shape of the base plate 52. This also applies to the second embodiment and examples of development described below.

(Second Embodiment)

Next, the second embodiment of the present invention will be described. In the following, a description of the portions common to those of the first embodiment described above will be omitted, and the description will center on the characterizing portion of the second embodiment.

FIG. 7 is a diagram illustrating a strap pin fitting 50A according to the second embodiment. In FIG. 7, the components that are common or similar to those of FIG. 4 are designated by the same reference numerals.

The second embodiment is the same as the first embodiment except that the structure of the presser plate 54 differs. More specifically, the presser plate 54 of the second embodiment functions as a plate spring capable of elastic deformation. Further, this presser plate 54 is rotatable around a rotation axis (rotation center) that is in the normal direction of the base plate 52. Reference numeral 69 designates the rotation shaft portion of the base plate 52.

In the present embodiment, when the strap pin fitting 50A and the strap pin 20 are to be connected to each other, the strap pin 20 is inserted into the large-hole portion 58a of the through-hole 58 from the lower surface side of the base plate 52 in a state in which positioning is effected between the strap pin 20 and the large-hole portion 58a of the through-hole 58 as in the first embodiment described above. At this time, the strap pin 20 is inserted into the large-hole portion 58a of the through-hole 58 while pushing down the presser plate 54 with the strap pin 20. While the presser plate 54, which functions as a plate spring, is curved and deformed due to the elastic force thereof, it is possible to insert the strap pin 20 into the large-hole portion 58a of the through-hole 58. Then, after the strap pin 20 is inserted into the large-hole portion 58a till the constricted portion 20a of the strap pin 20, the constricted portion 20a of the strap pin 20 is caused to slide to the small-hole portion 58b of the through-hole 58. Then, the presser plate 54 returns of itself to its original shape due to the elastic force thereof, and is restored to the closed position where the large-hole portion 58a of the through-hole 58 is closed. As a result, the strap pin 20 is prevented from detaching from the through-hole 58, and the strap pin fitting 50A and the strap pin 20 are reliably connected to each other.

In a case where the connection between the strap pin 20 and the strap pin fitting 50A is to be released, the presser plate 54 is rotated to the open position where the large-hole portion 58a of the through-hole 58 is opened (indicated by the chain double-dashed line) as shown by reference numeral 7A of FIG. 7, whereby it is possible to detach the strap pin 20 from the through-hole 58.

Thus, as in the first embodiment, also in the strap pin fitting 50A of the second embodiment, the strap 30 and the strap pin 20 are connected to each other with the strap pin fitting 50A interposed therebetween, whereby the strap 30 can be easily attached to and detached from the musical instrument 12.

In the present embodiment, it is not necessary for the presser plate 20 to exhibit a strength high enough to support the musical instrument 12, so long as the presser plate 20 has a function to close the large-hole portion 58a which is a part of the through-hole 58 so that the strap pin 20 may not be detached. Therefore, it is possible to use a resin or metal thin plate-shaped member which is thinner than the presser plate 54 of the first embodiment.

Further, while the presser plate 54 is rotatable around the rotation shaft portion 69 in the second embodiment, it is preferable for the presser plate 54 to be urged by an urging member such as a spring (not shown) toward the closed position where the large-hole portion 58a of the through-hole 58 is closed. This helps to prevent the connection between the strap pin fitting 50A and the strap pin 20 from being inadvertently released.

Further, in the second embodiment, it is preferable for the presser plate 54 to include an operating portion such as a protrusion. This makes it possible to easily perform the operation of rotating the presser plate 54 and facilitate the detachment operation when removing the strap pin fitting 50A from the strap pin 20.

(Example of development)

Next, an example of development of the present invention will be described. While the through-hole 58 provided in the base plate 52 is formed by connecting together the large-hole portion 58a and the small-hole portion 58b which have differ from each other in hole diameter in the above-described embodiments, the object of the present invention can be achieved even if the configuration of the through-hole 58 is not a combination of large and small hole portions.

FIG. 8 is a diagram illustrating a strap pin fitting 50B according to an example of development of the present invention. In FIG. 8, reference numeral 8A designates a plan view of the strap pin fitting 50B, and reference numeral 8B designates an exploded view of the strap pin fitting 50B. In FIG. 8, the components common or similar to those of FIG. 4 are designated by the same reference numerals.

As shown by reference numeral 8A of FIG. 8, from the viewpoint of design, the strap pin fitting 50B according to the example of development of the present invention is generally of a rounded configuration (a substantially egg-shaped configuration).

The strap pin fitting 50B is the same as the above-described embodiments in that the strap pin fitting 50B includes the base plate 52, the presser plate 54, and the strap retaining portion 56. However, the strap pin fitting 50B is greatly different from the above-described embodiments in that the through-hole 58 formed in the base plate 52 is a round hole having a circular shape in plan view. The inner diameter of the through-hole 58 is larger than the outer diameter of the divergent portion 20b of the strap pin 20 (See FIGS. 9 and 10).

As shown by reference numeral 8A of FIG. 8, in plan view, the presser plate 54 has a shape which substantially overlaps the proximal end side region of the base plate 52 (the strap retaining portion 56 side region), and the presser plate 54 is rotatable around a rotation axis (rotation center) that is in the normal direction of the base plate 52. When the presser plate 54 is arranged at a position (closed position) where the presser plate 54 overlaps the base plate 52, the presser plate 54 closes a part of the through-hole 58. At this time, the positional relationship and sizes of the presser plate 54 and the through-hole 58 are determined such that a clearance H formed between the through-hole 58 and the presser plate 54 is smaller than the outer diameter of the divergent portion 20b of the strap pin 20 and is larger than the outer diameter of the constricted portion 20a of the strap pin 20 (See FIGS. 9 and 10).

Thus, in a case where the presser plate 54 is rotated so as to arrange the presser plate 54 at the open position where the through-hole 58 is opened, a state is attained in which the strap pin 20 can be inserted into the through-hole 58. On the other hand, in a case where the presser plate 54 is rotated in a state in which the strap pin 20 is inserted into the through-hole 58 so as to arrange the presser plate 54 at the closed position where a part of the through-hole 58 is closed, the strap pin 20 is prevented from detaching from the through-hole 58 because the clearance H formed between the through-hole 58 and the presser plate 54 is of the above-mentioned size.

On both sides (both side surfaces) of the base plate 52, recessed portions (recesses) 70 are respectively provided. Due to the recessed portions 70, non-overlapping regions which do not overlap the base plate 52 are formed in the presser plate 54. Therefore, by pushing the presser plate 54 at positions corresponding to the regions in the rotational direction of the presser plate 54, it is possible to perform the operation of rotating the presser plate 54 simply and easily.

Further, the base plate 52 has, in an intermediate region corresponding to the interval between the strap retaining portion 56 and the through-hole 58, a protrusion 72 which has a circular shape in plan view and protrudes toward a side opposite the presser plate 54. In a case where the strap 30 is attached to the strap pin fitting 50B, the protrusion 72 functions as a strap support portion which supports the distal end portion of the strap 30.

The strap retaining portion 56 is a portion which fixes the strap 30 to the base plate 52 by using a bolt 74 and a nut 76. As shown by reference numerals 9A and 9B of FIG. 9, in a case where the strap 30 is to be attached to the strap retaining portion 56, a rotation hole 78 provided at the proximal end side of the presser plate 54, a bolt insertion hole 80 provided at the proximal end side of the base plate 52 and an attaching hole 36 of the strap 30 are positioned so as to overlap each other in plan view, and in this state, the bolt 74 is passed through the respective holes from the presser plate 54 side, and the distal end portion of the bolt 74 protruding from the opposite side is fastened by the nut 76 via a washer 82. At this time, the nut 76 is fastened to such a degree that the presser plate 54 can rotate by using the rotation hole 78 as a fulcrum. As a result, the strap pin fitting 50B and the strap 30 are connected to each other, and the rotation operation of the presser plate 54 is enabled.

As shown by reference numerals 9A and 9B of FIG. 9, in a case where the strap pin fitting 50B and the strap pin 20 are to be connected to each other, the presser plate 54 is rotated in a predetermined direction (for example, in the clockwise direction) to move the presser plate 54 to the open position. Then, the strap pin 20 is inserted into the through-hole 58 of the base plate 52. Next, as shown by reference numerals 10A and 10B of FIG. 10, the presser plate 54 is rotated in the reverse direction (for example, in the counterclockwise direction), and the presser plate 54 is restored to the former state, that is, moved to the closed position. As a result, the constricted portion 20a of the strap pin 20 inserted into the through-hole 58 of the base plate 52 is arranged in the clearance H formed between the through-hole 58 and the presser plate 54. Therefore, there is no fear that the strap pin 20 is detached from the through-hole 58, and the strap pin fitting 50B and the strap pin 20 are reliably connected to each other.

In a case where the connection between the strap pin fitting 50B and the strap pin 20 is to be released, procedures reverse to the above-described procedures should be executed, and a redundant description thereof will be left out.

As described above, in the strap pin fitting 50B according to the example of development of the present invention, the through-hole 58 provided in the base plate 52 consists of one hole portion, and, through the rotation of the presser plate 54, the presser plate 54 can be switched between the closed position where a part of the through-hole 58 is closed and the open position where the through-hole 58 is opened. Thus, the strap 30 and the strap pin 20 are connected to each other through the interposition of the strap pin fitting 50B, whereby the attachment and detachment of the strap 30 to and from the musical instrument 12 can be easily effected, and it is possible to achieve the same effects as those of the above-described embodiments.

Further, in the above-described example of development, while the presser plate 54 can be switched between the closed position where a part of the through-hole 58 is closed and the open position where the through-hole 58 is opened, this should not be construed restrictively. For example, the presser plate 54 may be formed by a thin resin or metal plate-shaped member in such a manner that the presser plate 54 functions as a plate spring capable of elastic deformation. In this structure, it is possible to connect the strap pin fitting 50B and the strap pin 20 by the same procedures as those of the above-described second embodiment without operation to rotate the presser plate 54. That is, in a state in which positioning is effected between the strap pin 20 and the through-hole 58, the strap pin 20 is inserted into the through-hole 58 from the lower surface side of the base plate 52. At this time, when the strap pin 20 is inserted into the through-hole 58 while pushing the presser plate 54 in with the strap pin 20, the presser plate 54, which functions as a plate spring, can insert the strap pin 20 into the through-hole 58 while undergoing curving and deformation due to the elastic force of the presser plate 54 itself. And, after the strap pin 20 is inserted into the through-hole 58 till the constricted portion 20a of the strap pin 20, the constricted portion 20a of the strap pin 20 is caused to slide to the edge portion of the through-hole 58 (the edge portion on the side opposite the strap retaining portion 56). Then, the presser plate 54 is restored of itself to the former shape due to the elastic force of the presser plate 54 itself, to be restored to the closed position where a part of the through-hole 58 is closed. As a result, the strap pin fitting 50B and the strap pin 20 are reliably connected to each other, while preventing the strap pin 20 from coming off from the through-hole 58.

In a case where the connection between the strap pin 20 and the strap pin fitting 50B is to be released, the presser plate 54 is rotated as in the above-described example of development, whereby it is possible to remove the strap pin 20 from the through-hole 58.

In the above-described example of development, the configuration in which the through-hole 58 provided in the base plate 52 is formed by a round hole having a circular shape in plan view, is shown as an example of the preferred aspect. However, this should not be construed restrictively. For example, through-hole 58 may have an elliptical shape, a polygonal shape, or some other shape.

The present invention is not restricted to the embodiments and the example of development thereof described above but naturally allows various improvements and modifications without departing from the range of the scope of the gist of the present invention.

REFERENCE SIGNS LIST

12 . . . musical instrument, 13 . . . body, 14 . . . end portion, 15 . . . neck, 16 . . . heel portion, 20 . . . strap pin, 20a . . . constricted portion, 20b . . . divergent portion, 20c . . . attaching portion, 30 . . . strap, 32 . . . belt-shaped member, 34 . . . attachment portion, 36 . . . attaching hole, 38 . . . slit, 56 . . . strap pin fitting, 52 . . . base plate, 54 . . . presser plate, 56 . . . strap retaining portion, 58 . . . through-hole, 58a . . . large-hole portion, 58b . . . small-hole portion, 62 . . . front end portion, 64 . . . rear end portion, 66 . . . bent portion, 68 . . . hinge portion, 69 . . . rotation shaft portion, 70 . . . recessed portion, 72 . . . protrusion, 74 . . . bolt, 76 . . . nut, 78 . . . rotation hole, 80 . . . bolt insertion hole, 82 . . . washer.

What is claimed is:

1. A strap pin fitting for detachably attaching a belt-shaped strap to a strap pin installed to a musical instrument,
   wherein the strap pin fitting is provided separately from the strap and the musical instrument,
   the strap pin fitting comprising:
   a base plate;
   a strap retaining portion arranged on the base plate and configured to retain an attaching hole with which the strap pin is engageable, the attaching hole being provided to each end of the strap;
   a through-hole formed in the base plate and configured to allow insertion of the strap pin; and
   a presser plate attached to the base plate and configured to be movable between an open position where the through-hole is opened so as to allow insertion of the strap pin into the through-hole and a closed position where a part of the through-hole is closed so as to prevent detachment of the strap pin from the through-hole.

2. The strap pin fitting according to claim 1, wherein the presser plate is attached so as to be rotatable around a rotation axis that is in a direction orthogonal to a normal direction of the base plate.

3. The strap pin fitting according to claim 1, wherein the presser plate is attached so as to be rotatable around a rotation axis that is in a normal direction of the base plate.

4. The strap pin fitting according to claim 2, comprising an urging member configured to urge the presser plate toward the closed position.

5. The strap pin fitting according to claim 1, wherein the through-hole is formed by connecting together a large-hole portion and a small-hole portion that differ from each other in hole diameter.

6. The strap pin fitting according to claim 1, wherein the through-hole is formed by a single round hole.

* * * * *